United States Patent [19]

Ogawa et al.

[11] Patent Number: 5,378,521
[45] Date of Patent: Jan. 3, 1995

[54] WATER-AND OIL-REPELLING MEMBERS AND METHOD OF MANUFACTURING THE SAME

[75] Inventors: Kazufumi Ogawa, Nara; Mamoru Soga, Osaka; Shigeo Ikuta, Tondabayashi, all of Japan

[73] Assignee: Matsushita Electric Industrial Co., Ltd., Osaka, Japan

[21] Appl. No.: 110,705

[22] Filed: Aug. 20, 1993

[30] Foreign Application Priority Data

Sep. 12, 1992 [JP] Japan .................. 4-244532

[51] Int. Cl.$^6$ .............................. B32B 3/02
[52] U.S. Cl. ................................ 428/85; 210/902; 210/922; 427/307; 427/309; 427/322; 427/327; 427/340; 427/341; 427/344; 427/352; 427/353; 428/95; 428/97; 428/375; 428/378; 428/391; 428/447; 428/450; 428/902
[58] Field of Search ............... 428/85, 95, 96, 375, 428/378, 391, 447, 450, 250, 97, 902; 210/902, 922; 427/307, 309, 322, 327, 340, 341, 344, 352, 353

[56] References Cited

U.S. PATENT DOCUMENTS

| 4,539,061 | 9/1985 | Sagiv | 156/278 |
| 4,761,316 | 8/1988 | Ogawa | 428/64 |
| 4,865,910 | 9/1989 | Inoguchi et al. | 428/268 |
| 5,011,727 | 4/1991 | Kido et al. | 428/141 |
| 5,011,963 | 4/1991 | Ogawa et al. | 556/485 |
| 5,143,750 | 9/1992 | Yamagata et al. | 427/57 |

Primary Examiner—James J. Bell
Attorney, Agent, or Firm—Fish & Richardson

[57] ABSTRACT

Members with excellent water- and oil-repelling, and anti-contaminating properties are provided by exposing fillers partially protruding from the surfaces of fiber reinforced plastics or fiber reinforced metals and chemically adsorbing a chlorosilane-based chemical adsorbent to the rough surface of the fiber reinforced plastic or metal substrate. A siloxane-based chemically adsorbed monomolecular film or a polysiloxane chemically adsorbed film is formed on the substrate by chemically adsorbing a chemical adsorbent having numerous chlorosilane groups to the substrate surface. Following that, a chlorosilane-based chemical adsorbent having fluorocarbon groups is chemically adsorbed to the film, thus forming a chemically adsorbed monomolecular or polymer film with water- and oil-repelling properties.

9 Claims, 4 Drawing Sheets

WATER- AND OIL-REPELLING MEMBERS AND METHOD OF MANUFACTURING THE SAME

FIELD OF THE INVENTION

The invention relates to water- and oil-repelling members having anti-mist, anti-contamination and anti-frost properties, and a method of treating the surfaces of the members to have ultra water- and oil-repelling properties by positively utilizing the fillers partially protruded from the surfaces of fiber reinforced metals (FRM) or fiber reinforced plastics (FRP).

BACKGROUND OF THE INVENTION

A chemical adsorption method has been well known as a method of forming monomolecular films in solution. In this method, monomolecular films are formed by a dehydrochlorination reaction between the chlorosilyl groups of fluorocarbon-based chemical adsorbents in solution and active hydrogens such as hydroxyl groups, carboxylic acids, amino groups, imino groups or the like on substrate surfaces (for example, EPC-0492545A2/1992, U.S. Pat. No. 4,992,300, 1991).

In this conventional chemical adsorption method, however, it has been difficult to form a highly water- and oil-repelling film (having a contact angle of 130° or higher) with excellent anti-mist, anti-contamination and anti-frost properties on a flat member surface.

SUMMARY OF THE INVENTION

In order to solve the problem of the conventional method, the invention provides water- and oil-repelling members with excellent anti-mist, anti-contamination and anti-frost properties by forming chemically adsorbed films with water- and oil-repelling properties on members which have convex and concave surfaces due to fillers partially protruding from the surfaces of FRM or FRP.

In order to accomplish the above, the water- and oil-repelling member of the invention comprises a chemically adsorbed film covering the exposed surface of at least one filler partially protruding from the surface of FRM or FRP; this chemically adsorbed film is covalently bonded to the filler.

It is preferable in this composition that the filler is at least one material chosen from the group consisting of ceramics, glass, metals, and synthetic fibers.

It is also preferable in this composition that the siloxane-based chemically adsorbed monomolecular or polymer film (inner layer) is covalently bonded to the filler, and that a chemically adsorbed monomolecular or polymer film with water- and oil-repelling properties outer layer) is covalently bonded to the inner layer.

A method of manufacturing the siloxane-based chemically adsorbed monomolecular film (inner layer) of the invention includes the steps of:

treating the surface of FRM or FRP, thus exposing the surface of at least one filler partially protruding from the surface;

contacting the surface of FRM or FRP with a solution containing a chlorosilane-based chemical adsorbent, thus directly or indirectly chemically adsorbing the adsorbent to at least the exposed surface of the protruding filler;

removing unreacted chemical adsorbent with a honaqueous organic solvent; and reacting the chemical adsorbent remaining on the surface of FRM or FRP with water, thus forming a silane-based chemically adsorbed monomolecular film (inner layer).

Another method of manufacturing the silane-based chemically adsorbed polymer film (inner layer) of the invention includes the steps of:

treating the surface of FRM or FRP, thus exposing the surface of at least one filler partially protruding from the surface;

contacting the surface of FRM or FRP with a solution containing a chlorosilane-based chemical adsorbent, thus directly or indirectly chemically adsorbing the adsorbent to at least the exposed surface of the protruding filler;

evaporating the solution containing unreacted chemical adsorbent from the surface: and reacting the chlorosilyl groups of the chemical adsorbent remaining on the surface with water, thus forming a siloxane-based chemically adsorbed polymer film (inner layer).

In these methods, it is preferable that the chlorosilane-based chemical adsorbent is $CF_3(CF_2)_n(R)_mSiX_pCl_{3-p}$ (wherein n represents 0 or all integer: R represents an alkyl group, a vinyl group, an ethynyl group or a substituent comprising a silicon atom or an oxygen atom; m represents 0 or 1; X represents H, an alkyl group, an alkoxyl group or a substituent comprising a fluoroalkyl group or a fluoroalkoxy group; and p represents 0, 1 or 2).

In these methods, it is also preferable that the filler is caused to partially protrude from the surface of FRM or FRP by sand blasting, etching, polishing, or plasma treatment.

In these methods, a siloxane-based chemically adsorbed monomolecular or polymer film can be built up on the previously formed siloxane-based chemically adsorbed monomolecular or polymer film (inner layer) before forming the chemically adsorbed monomolecular or polymer film with water- and oil-repelling properties (outer layer).

In these methods, the siloxane-based chemically adsorbed film (inner layer) is either a monomolecular film or a polymer film. However, it is preferable that the inner layer is a monomolecular film since such a film is uniformly ultra thin and has an excellent transparency.

In these methods, the siloxane-based chemically adsorbed monomolecular or polymer film (inner layer) is covalently bonded to the substrate surface, and the chemically adsorbed monomolecular or polymer film with water- and oil-repelling properties (outer layer) is covalently bonded to the inner layer. Therefore, the adherence of the multilayer film, including the inner layer and the outer layer, to the substrate surface is significantly improved.

It is preferable that at least one filler in FRM or FRP is caused to partially protrude from the surface of FRM or FRP by sand blasting, etching, polishing, or plasma treatment. As a chlorosilane-based chemical adsorbent, $CF_3(CF_2)_n(R)_mSiX_pCl_{3-p}$ (wherein n represents 0 or an integer; R represents an alkyl group, a vinyl group, an ethynyl group, or a substituent comprising a silicon atom of an oxygen atom; m represents 0 or 1; X represents H, an alkyl group, an alkoxyl group, or a substituent comprising a fluoroalkyl group or a fluoroalkoxy group; and p represents 0, 1 or 2) is preferably used. It is preferable that the filler is at least one material selected from the group consisting of ceramics, glass, metals and hydrophilic fibers such as nylon and polyurethane, since these materials provide active hydrogens, reactive to chlorosilyl groups, on their surfaces.

In case of using water-repelling plastics for FRP, in addition, it is preferable to treat the surfaces of FRP with oxygen plasma or corona discharge, thus making the surfaces hydrophilic and introducing active groups to the plastic surfaces. Therefore, the siloxane-based chemically adsorbed monomolecular or polymer film (inner layer) can be chemically adsorbed to the surfaces of FRP at high density.

It is preferable to select at least one material having numerous chlorosilyl groups from the group consisting of $SiCl_4$, $SiHCl_3$, $SiH_2Cl_2$ and $Cl(SiCl_2O)_nSiCl_3$ (wherein n represents an integer), thus forming the siloxane-based chemically adsorbed monomolecular or polymer film (inner layer) efficiently.

In the composition of the invention, the chemically adsorbed monomolecular or polymer film with water- and oil-repelling properties (outer layer) is formed at least on the exposed surfaces of fillers partially protruding from the surface of FRM or FRP. Therefore, the chemically adsorbed monomolecular or polymer film can provide excellent water- and oil-repelling, anti-mist, anti-contamination and anti-frost properties to the surface of FRM or FRP. The chemically adsorbed monomolecular or polymer film is also strong, stable and thin since the film is covalently bonded to the fillers.

Based on the preferable composition that a filler is at least one material selected from the group consisting of ceramics, glass, metals and synthetic fibers, the chemically adsorbed monomolecular or polymer film with water- and oil-repelling properties (outer layer) can be formed with a uniform thickness.

In the preferable composition in which both the siloxane-based chemically adsorbed monomolecular or polymer film (inner layer) and the chemically adsorbed monomolecular or polymer film with water- and oil-repelling properties (outer layer) are covalently bonded, the multilayer film can be formed at high density.

According to the method of manufacturing the siloxane-based chemically adsorbed monomolecular film of the invention, a uniformly thin and pinhole-free chemically adsorbed monomolecular film having excellent water- and oil-repelling, anti-heat and endurance properties (outer layer) can be chemically bonded to the surface of FRM or FRP without reducing the surface roughness of these materials.

According to the method of manufacturing the siloxane-based chemically adsorbed polymer film of the invention, a uniformly thin and pinhole-free chemically adsorbed polymer film having excellent water- and oil-repelling, anti-heat and endurance properties (outer layer) can also be chemically bonded to the surface of FRM or FRP without reducing the surface roughness of these materials.

The preferable composition described above, in which the siloxane-based chemically adsorbed monomolecular or polymer film (inner layer) is chemically bonded to the surface of FRM or FRP and that the chemically adsorbed monomolecular or polymer film with water- and oil-repelling properties (outer layer) is also chemically bonded to the inner layer, produces a uniformly thin and pinhole-free chemically adsorbed monomolecular or polymer film with excellent water- and oil-repelling, anti-heat and endurance properties (outer layer) chemically bonded to the surface. In other words, the siloxane-based chemically adsorbed monomolecular or polymer film comprising numerous —SiOH bonds (inner layer) is bonded to the exposed filler surfaces via siloxane bonds (covalent bonds): the chemically adsorbed monomolecular or polymer film with water- and oil-repelling properties is bonded to the inner layer via —SiO bonds due to a dehydrochlorination reaction between the chlorosilyl groups of a chlorosilane chemical adsorbent and —OH groups of the inner layer.

Regardless of the method used, the chemically adsorbed monomolecular or polymer film with water- and oil-repelling properties does not spoil the surface roughness of FRP or FRM since the film is only dozens of angstroms thick. Therefore, by forming a highly adherent chemically adsorbed monomolecular or polymer film with water- and oil-repelling properties at least on the exposed filler surfaces, members with extremely high water- and oil-repelling properties can be provided in the invention.

DETAILED DESCRIPTION OF THE INVENTION

Figure 1:
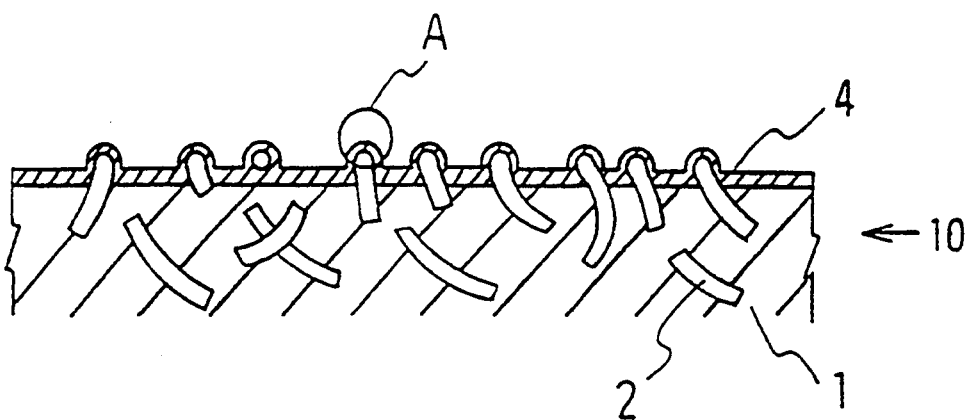
FIG. 1 shows a cross-sectional view of a siloxane-based chemically adsorbed monomolecular film (inner layer) of Example 1 on a substrate.

Fiber reinforced plastics (FRP)—plastics such as polyester resins, urethane resins and acrylic resins containing dispersed powder or fibers of ceramics, glass or metal—and fiber reinforced metals (FRM)—metals such as Al, Cu, Ti and an alloy of metals containing dispersed powder or fibers of ceramics, glass or metal—can be used as substrates of the invention. Cloth such as water-repelling sailcloth is another example of a substrate which can be used in the invention.

At least one filler of FRP or FRM is caused to partially protrude from the surface of FRP or FRM by sandblasting, etching, polishing, or plasma treatment.

As a result, FRP or FRM has convex and concave surfaces at the micron level.

A solution is prepared by dissolving about 0.1–30% by weight of a chemical adsorbent having numerous chlorosilyl groups in a nonaqueous organic solvent. (The weight % of the chemical adsorbent varies depending on the kinds of chemical adsorbents and solvents used.) A substrate is dipped and held in the solution for about 60 minutes, thus adsorbing and fixing numerous chlorosilyl groups of the adsorbent to the substrate surface having some hydrophilic OH groups on it by a dehydrochlorination reaction between the chlorosilyl groups and the OH groups. The substrate is throughly watched with a nonaqueous solution, and then with water, removing the chemical adsorbent containing unreacted chlorosilyl groups. As a result, a siloxane chemically adsorbed monomolecular film (inner layer) is formed on the substrate. By skipping the step of washing the substrate with a nonaqueous solution, a polysiloxane chemically adsorbed film is formed instead.

As the chemical adsorbents having numerous chlorosilyl groups, $SiCl_4$, $SiHCl_3$, $SiH_2Cl_2$, $Cl(SiCl_2O)_n$-$SiCl_3$ (wherein n represents an integer) and the like are used.

It is particularly preferable to use $SiCl_4$ since it includes small molecules highly reactive to hydroxyl groups and can make the substrate surface uniformly hydrophilic.

As a gaseous atmosphere in which the chemical adsorbents having numerous chlorosilyl groups can be adsorbed to the substrates, nonaqueous gas such as dry nitrogen or the like is used.

There are numerous hydroxyl groups (—OH) on the surface of the inner layer. Therefore, a fluorocarbon-based chemical adsorbent having chlorosilyl groups can be reacted to the hydroxyl groups of the surface. (In the case that the surface of FRP or FRM is highly hydrophilic, it is not necessary to form the inner layer on the surface.)

A solution is prepared by dissolving about 0.01–50% by weight of a fluorocarbon-based chemical adsorbent having chlorosilyl groups in a solvent. (The weight % of the chemical adsorbent varies depending on the kinds of the chemical adsorbents and the solvents used. Particularly, 0.1–5% by weight is preferable.) The substrate is dipped and held in the solution for about thirty minutes, thereby adsorbing and fixing the fluorocarbon-based chemical adsorbent to the substrate surface having numerous hydrophilic OH groups due to a dehydrochlorination reaction between the chlorosilyl groups of the chemical adsorbent and the OH groups. The substrate is washed throughly with a nonaqueous solvent, and then with water, thus removing the fluorocarbon-based chemical adsorbent containing unreacted chlorosilyl groups and forming a chemically adsorbed monomolecular film with water- and oil-repelling properties (outer layer) at least on the partially exposed filler surfaces. By skipping the step of washing the substrate with a nonaqueous solvent, a chemically adsorbed polymer film comprising chlorosilyl groups and having water- and oil-repelling properties is formed instead. This polymer film is also formed by a dehydrochlorination reaction between the chlorosilyl groups and the hydrophilic OH groups.

It is possible to use compounds comprising fluorocarbon groups and chlorosilane groups—specifically, $CF_3(CF_2)_n(R)_mSiX_pCl_{3-p}$ (wherein n represents 0 or an integer preferably between 1 and 22; R represents an alkyl group, a vinyl group, an ethynyl group or a substituent comprising a silicon or an oxygen atom; m represents 0 or 1; X represents H, an alkyl group, an alkoxyl group, a substituent comprising a fluoroalkyl group or a fluoroalkoxy group; and p represents 0, 1 or 2)—as the chemical adsorbents. These compounds having fluorine and chlorosilyl groups can provide water- and oil-repelling, anti-contamination and lubrication properties to the substrate surfaces.

This invention can be applicable for various uses and materials as described in the following:

(a) examples of substrates—fiber or whisker reinforced metals, fiber or whisker reinforced plastics and the like;

(b) examples of cutlery—kitchen and other knives, scissors, engravers, razor blades, hair clippers, saws, planes, chisels, gimlets, bodkins, cutting tools, drill tips, blender blades, juicer blades, flour mill blades, lawn mower blades, punches, straw cutters, staplers, blades for can openers, surgical knives and the like;

(c) examples of molding parts—die for press molding, die for cast molding, die for injection molding, die for transfer molding, die for vacuum molding, die for blow forming, die for extrusion molding, die for inflation molding, die for fiber spinning, calender processing roll;

(d) examples of molds for food—cake mold, cookie mold, bread mold, chocolate mold, jelly mold, ice cream mold, oven plate, ice cube tray and the like;

(e) examples of resin—polyolefin (such as polypropylene, polyethylene, etc.), polyvinylchloride, polyvinylidenechloride, polyamide, polyimide, polyamideimide, polyester, aromatic polyester, polystyrene, polysulfone, polyethersulfone, polyphenylenesulfide, phenolic resin, furan resin, urea resin, epoxide, polyurethane, silicone resin, ABS resin, methacrylic resin, ethylacrylate resin, ester resin, polyacetal, polyphenyleneoxide and the like;

(f) examples of household electric goods—television, radio, tape recorder, audio goods, CD player, refrigerator, freezer, air conditioner, juicer, blender, blade of an electric fan, lighting equipment, dial plate, hair drier for permanent waves and the like;

(g) examples of sporting goods—skis, fishing rods, poles for pole vaulting, boats, sailboats, jet skis, surfboards, golf balls, bowling balls, fishing lines, fishing nets, fishing floats and the like;

(h) examples of vehicle parts;
  (1) ABS resin—lamp cover, instrument panel, trimming parts, and protector for a motorcycle,
  (2) cellulose plastic—markings for automobile, and steering wheels,
  (3) FRP (fiber reinforced plastics)—bumpers and engine covers,
  (4) phenolic resin—printed wiring boards,
  (5) polyacetal—wiper gears, gas valves, carburetor parts,
  (6) polyamide—radiator fan,
  (7) polyarylate—direction indicator lamp (or lens), cowl board lens, relay case,
  (8) polybutylene terephthalate—rear end, front fender,
  (9) poly amino-bismaleimide—engine parts, gear box, wheel, suspension drive system,

(10) methacrylate resin—lamp cover lens, meter panel and cover, and center mark,
(11) polypropylene—bumper,
(12) polyphenylene oxide—radiator grill, wheel cap,
(13) polyurethane—bumper, fender, instrument panel, and fan,
(14) unsaturated polyester resin—body, gas tank, heater housing, meter panel, (i) examples of stationery goods—fountain pen, ball-point pen, mechanical pencil, pencil case, binder, desk, chair, book shelf, rack, telephone base, ruler, draftsman's outfit and the like;

(j) examples of building materials—roof materials (such as ceramic tile, slate, tin such as used in galvanized iron plate, etc.), outer wall materials (such as wood including processed wood, mortar, concrete, ceramic sizing, metallic sizing, brick, building stone, plastic material, metallic material including aluminum, etc.), interior materials (such as wood including processed wood, metallic material including aluminum, plastic material, paper, fiber, etc.) and the like;

(k) examples of musical instruments and audio apparatus—percussion instruments, string instruments, keyboard instruments, woodwind instruments, brass instruments or the like, more specifically, drum, cymbals, violin, cello, guitar, koto, piano, flute, clarinet, shakuhachi, horn, etc., and microphone, speaker, earphone and the like.

This invention will now be explained specifically in the following examples.

EXAMPLE 1

Figure 2:
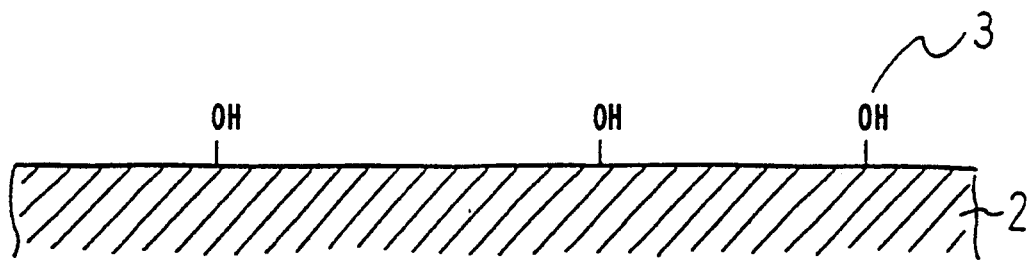
FIG. 2 shows a cross-sectional view of an exposed filler surface of Example 1, enlarged to a molecular level, before the formation of the siloxane-based chemically adsorbed monomolecular film depicted in FIG. 1.

As shown in FIG. 1, a glass fiber reinforced aluminum 10 (FRM containing glass fiber fillers 2 about 10 microns in diameter and 300 microns in length) was used as a substrate. The surface of the substrate was treated with sandblasting. Since glass fiber fillers 2 are harder than aluminum 1, only aluminum 1 was abraded by the sandblasting treatment, thus exposing at least one filler partially protruding from the substrate surface. As a result, glass fiber reinforced aluminum 10 was obtained having concave and convex surfaces about 10 microns in diameter. Then, a chlorosilane solution was prepared by dissolving 3% by weight of tetrachlorosilane (SiCl$_4$) and 5% of chloroform in a hexadecane solution. Glass fiber reinforced aluminum 10 was dipped and held in the solution for about 30 minutes at room temperature in a dry nitrogen atmosphere. Since there were a few exposed hydrophilic —OH groups 3 on the surfaces of glass fiber fillers 2 and aluminum 1 (FIG. 2), the molecules of Formula 1 and/or Formula 2 were fixed to the substrate surface via —SiO— bonds.

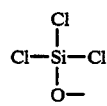

Formula 1

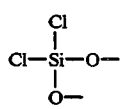

Formula 2

Figure 3:
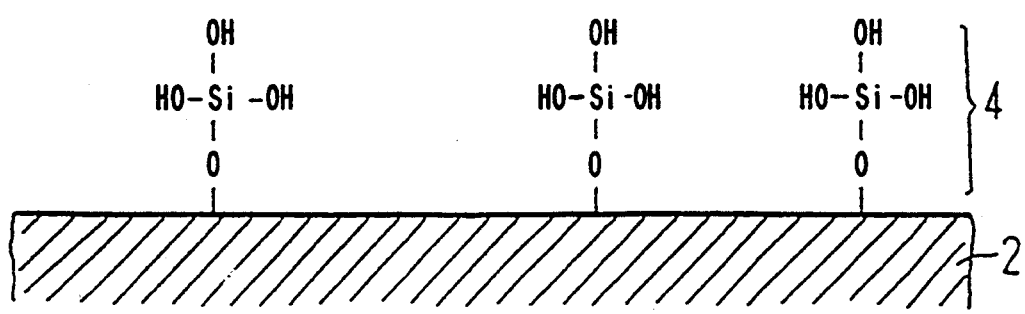
FIG. 3 shows a cross-sectional view of section A of FIG. 1 enlarged to a molecular level.

Thereafter, glass fiber reinforced aluminum 10 was washed with a nonaqueous solvent such as chloroform, and then with water, thus removing unreacted SiCl$_4$ molecules. After that, the chlorosilyl groups on the substrate surface were reacted with water, thus forming a siloxane chemically adsorbed monomolecular film 4 comprising numerous silanol groups (inner layer) on its surface, as shown in FIG. 3. In other words, the molecules of Formula 3 and/or Formula 4 were bonded to the substrate surface. By skipping the procedure of washing glass fiber reinforced aluminum 10 with the nonaqueous solvent, a polysiloxane chemically adsorbed film comprising numerous silanol groups (inner layer) was formed instead.

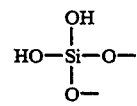

Formula 3

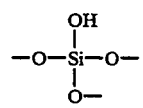

Formula 4

The siloxane chemically adsorbed monomolecular film 4 or the polysiloxane chemically adsorbed film, which is firmly bonded to the surface of glass fiber reinforced aluminum 10 via —SiO— bonds, cannot be peeled off from the surface.

The number of hydroxyl groups on siloxane chemically adsorbed monomolecular film 4 or the polysiloxane chemically adsorbed film was increased about threefold from the number of those on the surface of glass fiber reinforced aluminum 10 prior to this treatment.

Figure 4:
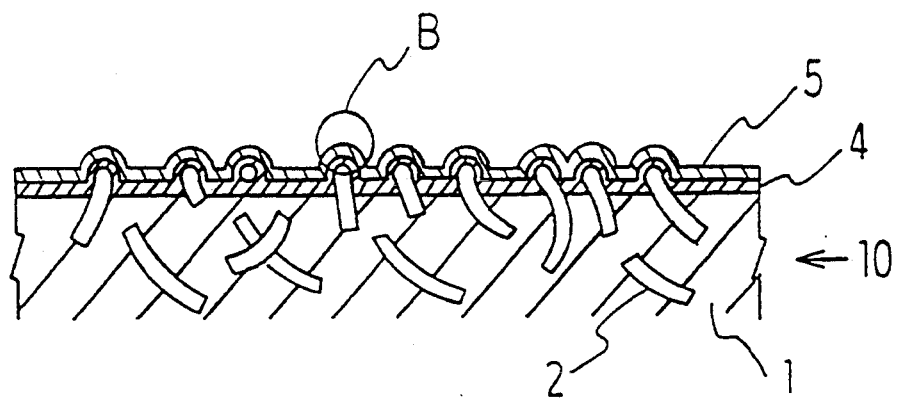
FIG. 4 shows a cross-sectional view of a chemically adsorbed monomolecular film with water- and oil-repelling properties (outer layer) built up on the siloxane-based chemically adsorbed monomolecular film (inner layer) of Example 1.
Figure 5:
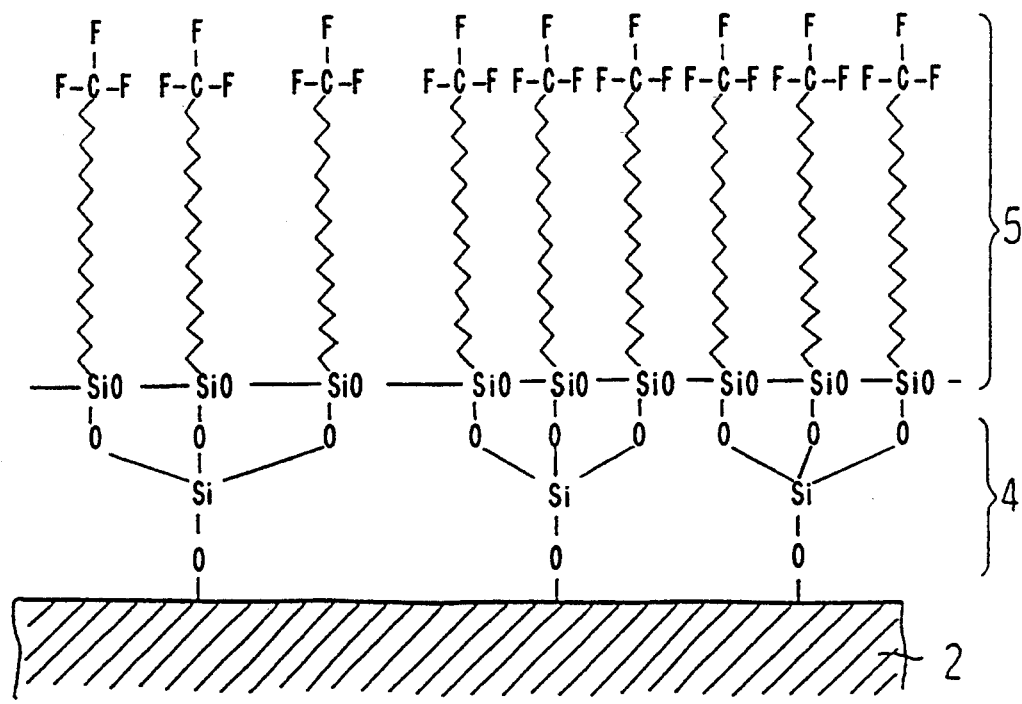
FIG. 5 shows a cross-sectional view of section B of FIG. 4 enlarged to a molecular level.

A fluorocarbon-based solution was prepared by dissolving about 1% by weight of CF$_3$(CF$_2$)$_7$(CH$_2$)$_2$SiCl$_3$ comprising fluorocarbon groups and chlorosilane groups into a mixed solvent of 80% by weight of hexadecane, 12% by weight of chloroform and 8% by weight of carbon tetrachloride. The substrate having siloxane chemically adsorbed monomolecular film 4 or the polysiloxane chemically film formed on it was dipped and held in the solution for about one hour. The substrate was washed with a nonaqueous solvent such as cyclohexane, and then with water, thus removing unreacted CF$_3$(CF$_2$)$_7$(CH$_2$)$_2$SiCl$_3$ molecules. As a result, as shown in FIG. 4 and FIG. 5, a chemically adsorbed monomolecular film 5 comprising fluorocarbon groups was formed on the surface of siloxane chemically adsorbed monomolecular film 4 or the polysiloxane chemically adsorbed film via bonds of Formula 5.

Formula 5

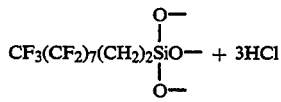

FIG. 5 shows a cross-sectional view of section B of FIG. 4 enlarged to a molecular level. In FIG. 5, chemically adsorbed monomolecular film 5 comprising fluorine is bonded to siloxane chemically adsorbed monomolecular film 4 via chemical bonds (covalent bonds).

By skipping the step of washing the substrate with a nonaqueous solvent, a fluorocarbon-based chemically adsorbed polymer film instead was formed on the surface of siloxane chemically adsorbed monofilm 4 or the polysiloxane chemically adsorbed film. Chemically adsorbed monomolecular film 5 and the fluorocarbon-based chemically adsorbed polymer film were not peeled off from the substrate surface in a cross cut test (JIS G0202).

EXAMPLE 2

Figure 6:
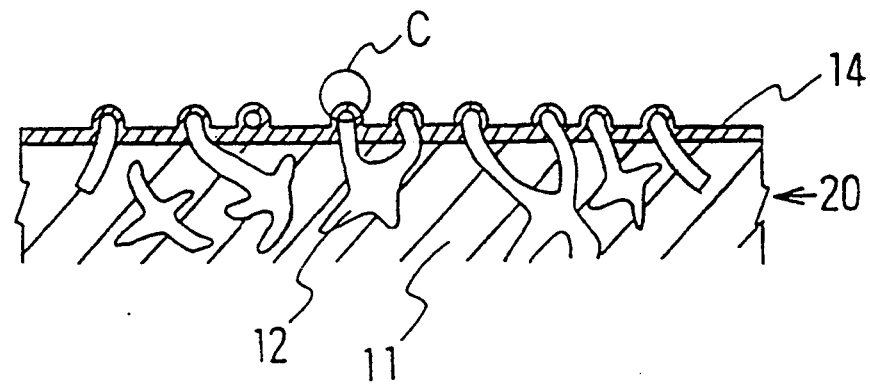
FIG. 6 shows a cross-sectional view of the siloxane-based chemically adsorbed monomolecular film (inner layer) of Example 2 on a substrate.

As shown in FIG. 6, fiber reinforced plastic 20—acrylic resin 11 containing dispersed zinc oxide whiskers 12 (fillers) about 50 microns in length—was used as a substrate. The surface of acrylic resin 11 was treated with sandblasting. As a result, at least one filler was caused to partially protrude from the surface of fiber reinforced plastic 20 since zinc oxide whiskers 12 are harder than acrylic resin 11. Therefore, the substrate surface thus obtained had convex and concave surfaces about 5 microns in diameter. Then, a chlorosilane solution containing numerous chlorosilyl groups was prepared by dissolving 3% by weight of octachlorosiloxane comprising numerous chlorosilyl groups (chemical adsorbent: Formula 6) in nonaqueous Freon-113 solvent.

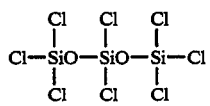

Formula 6

Figure 7:
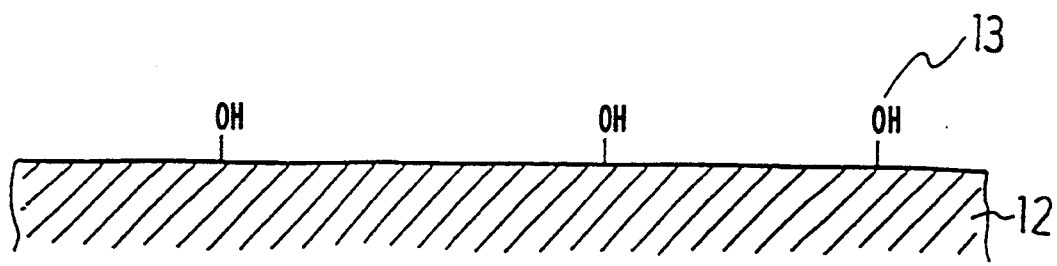
FIG. 7 shows a cross-sectional view of an exposed filler surface of Example 2, enlarged to a molecular level, before the formation of the siloxane-based chemically adsorbed monomolecular film depicted in FIG. 6.

Fiber reinforced plastic 20 was dipped and held in the solution for about 40 minutes, thus generating a dehydrochlorination reaction between some of the hydrophilic OH groups 13 on the surfaces of whiskers 12 (FIG. 7) and the chlorosilyl groups in the solution. Then, the chemical adsorbent containing unreacted chlorosilyl groups (Formula 6) was removed from the surface of fiber reinforced plastic 20 with Freon-113, thereby forming a chlorosilane monomolecular film. FIG. 7 shows a cross-sectional view of the exposed filler surface of Example 2, enlarged to a molecular level, before the formation of the siloxane-based chemically adsorbed monomolecular film. By using the chemical adsorbent of Formula 6 as the chemical adsorbent containing chlorosilyl groups, the dehydrochlorination reaction is generated even if there are only a few hydrophilic OH groups on the surfaces of zinc oxide whiskers 12. Due to the reaction, the molecules of the following Formula 7 and/or Formula 8 were bonded to the surfaces via —SiO— bonds.

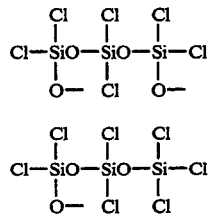

Formula 7

Formula 8

Figure 8:
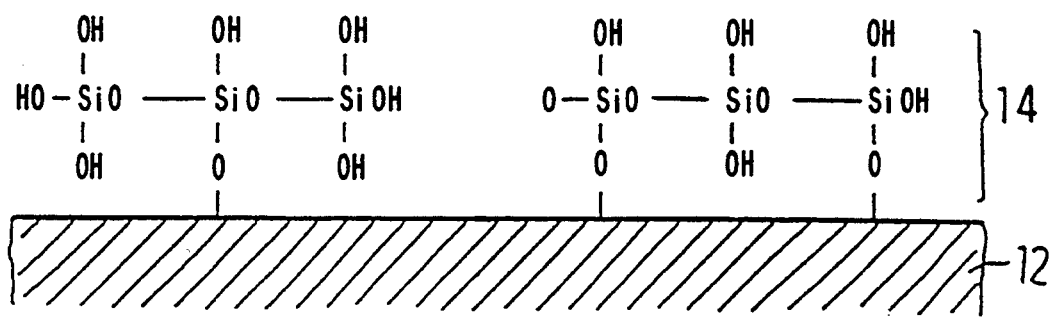
FIG. 8 shows a cross-sectional view of section C of FIG. 6 enlarged to molecular level.

After the dehydrochlorination reaction mentioned above, unreacted chemical adsorbent is generally left on the surface of the chlorosilane monomolecular film. Then, fiber reinforced plastic 20 was washed with Freon-113, and then with water, thereby removing the molecules which did not react with the hydroxyl groups 13 on the exposed surfaces of whiskers 12 and forming a siloxane chemically adsorbed monomolecular film 14 (inner layer) comprising molecules of the following Formula 9 and/or Formula 10 (FIG. 6 and FIG. 8).

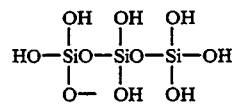

Formula 9

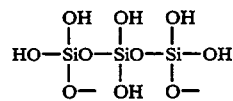

Formula 10

By skipping the step of washing the substrate with Freon-113, a polysiloxane chemically adsorbed film (inner layer) was formed instead. Siloxane chemically adsorbed monomolecular film 14 and the polysiloxane chemically adsorbed film, firmly bonded to the exposed surfaces of whiskers 12 via —SiO— bonds, could not be peeled off from the surfaces. The number of hydroxyl groups on the surface of siloxane chemically adsorbed monomolecular film 14 was increased about sevenfold from the previous number of the groups on the substrate surface (FIG. 7 and FIG. 8).

A fluorocarbon solution was prepared by dissolving about 1% by weight of $CF_3(CF_2)_5(CH_2)_2SiCl_3$ in a xylene solvent. FRP 11 having siloxane chemically adsorbed monomolecular film 14 or the polysiloxane chemically adsorbed film formed on it was dipped and held in the solution for about one hour. As a result, a chemically adsorbed monomolecular film 15 with a uniform thickness of about 1.5 nm comprising fluorocarbon groups was formed on the surface of siloxane chemically adsorbed monomolecular film 14 or the polysiloxane chemically adsorbed film via bonds of Formula 5 (FIG. 9).

Figure 9:
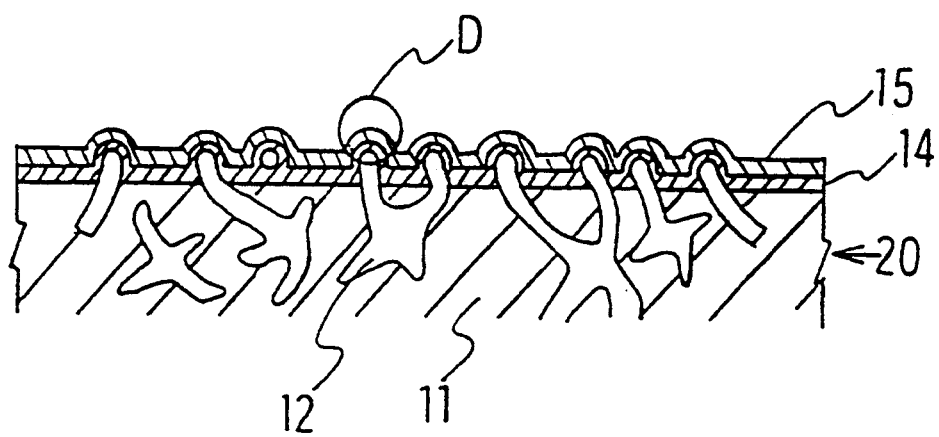
FIG. 9 shows a cross-sectional view of the chemically adsorbed monomolecular film with water- and oil-repelling properties built up on a siloxane-based chemically adsorbed monomolecular film (inner layer) of Example 2.
Figure 10:
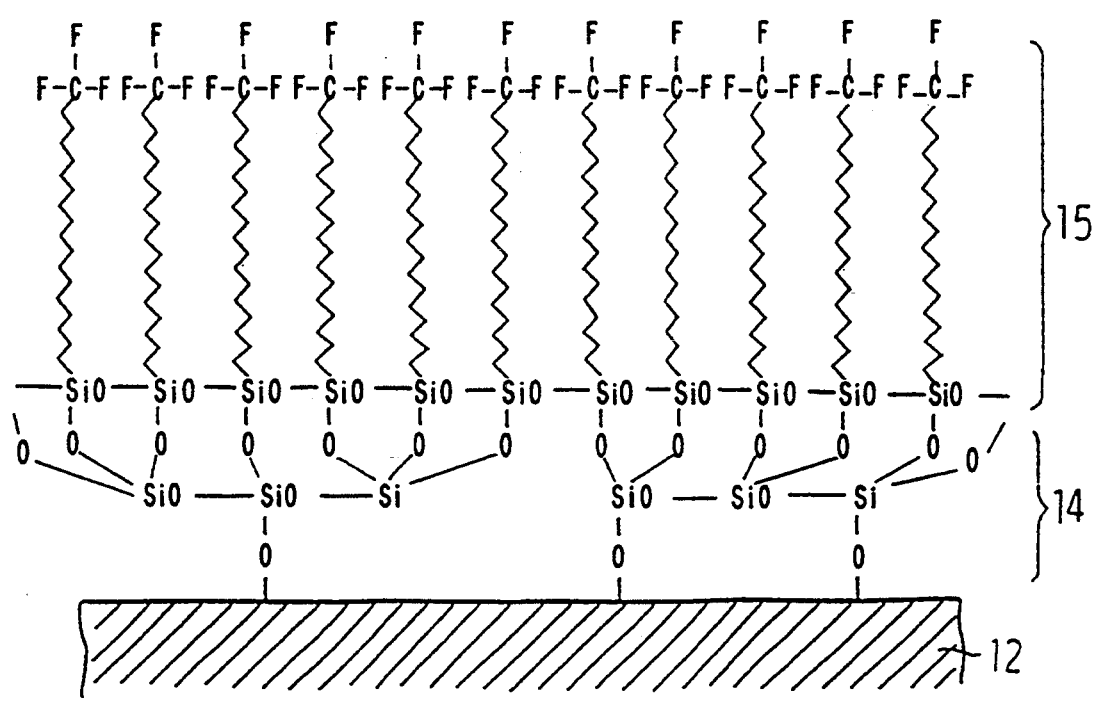
FIG. 10 shows a cross-sectional view of section D of FIG. 9 enlarged to a molecular level.

FIG. 10 shows a cross-sectional view of section D of FIG. 9 enlarged to a molecular level. In FIG. 10, a chemically adsorbed monomolecular film 15 comprising fluorocarbon groups is chemically (covalently) bonded to siloxane chemically adsorbed monomolecular film 14.

By skipping the step of washing the substrate with a nonaqueous solvent, a fluorocarbon-based polymer film was formed instead. Chemically adsorbed film 15 and the fluorocarbon-based polymer film could not be peeled off from the substrate surface in a cross cut test. Due to the water-repelling effect of fluorocarbon groups in the films, drops of water did not adhere to the FRP surface. In addition, oil could not adhere to the FRP surface even if the surface was touched by hand. This was because of the oil-repelling effect of fluorocarbon groups in the films.

If a substrate surface has no hydroxyl groups already on it, such as FRP made mainly of acrylic resin, the surface can be treated with oxygen plasma at 100 W for 20 minutes or with corona discharge. These treatments introduce hydroxyl groups into the substrate surface, and a fluorocarbon-based chemically adsorbed film can be formed on the surface, thus improving the water- and oil-repelling properties of the substrate surface. When a polyamide resin or a polyurethane resin is used as a substrate, there are imino groups (>NH) on the substrate surface. Therefore, by a dehydrochlorination reaction between the hydrogen atoms of the imino groups (>NH) and chlorosilyl groups (—SiCl) of a chemical adsorbent, an adsorbed film can be formed on the substrate surface via silicon-nitrogen bonds (—SiN—) simply by a chemical treatment.

EXAMPLE 3

An experiment similar to Example 2 was conducted in this example, except that acrylic resin was replaced with polycarbonate resin and heptadecafluorodecyltrichlorosilane was replaced with tridecafluorooctyltrichlorosilane: $CF_3(CF_2)_5(CH_2)_2SiCl_3$.

EXAMPLE 4

An experiment similar to Example 2 was conducted in this example, except that acrylic resin was replaced with polypropylene resin and heptadecafluorodecyltrichlorosilane was replaced with perfluorodecyltrichlorosilane.

EXAMPLE 5

An experiment similar to Example 2 was conducted in this example, except that acrylic resin was replaced with ABS resin and zinc oxide whisker was replaced with alumina (about 30 microns in length).

EXAMPLE 6

An experiment similar to Example 2 was conducted in this example, except that acrylic resin was replaced with epoxy resin and zinc oxide whisker was replaced with glass fiber (about 5 microns in diameter and about 100 microns in length).

EXAMPLE 7

An experiment similar to Example 1 was conducted in this example, except that fiber reinforced aluminum (aluminum FRM) was replaced with fiber reinforced copper (copper FRM).

EXAMPLE 8

An experiment similar to Example 2 was conducted in this example, except that acrylic resin was replaced with butadienestyrene resin.

EXAMPLE 9

An experiment similar to Example 2 was conducted in this example, except that acrylic resin was replaced with isobutyleneisoprene rubber resin.

EXAMPLE 10

An experiment similar to Example 2 was conducted in this example, except that acrylic resin was replaced with nitrile rubber resin.

EXAMPLE 11

An experiment similar to Example 2 was conducted in this example, except that octachlorosiloxane was replaced with tetrachlorosilane.

EXAMPLE 12

An experiment similar to Example 2 was conducted in this example, except that the plasma or corona treatment was replaced with a method of dipping and holding a substrate in concentrated sulphuric acid containing 10% by weight of potassium dichromate for five minutes.

REFERENCE 1

After spin-coating the surface of a polycarbonate resin with a methanol solution containing 2% by weight of a silane coupling agent (heptadecafluorodecyltrimethoxysilane), the surface was dried at 120° C. for one hour.

REFERENCE 2

Without applying the oxygen plasma or corona treatment to the acrylic resin of Example 2, a chemically adsorbed monomolecular film comprising heptadecafluorodecyltrichlorosilane was formed.

REFERENCE 3

After spraying and coating the surface of the acrylic resin of Example 2 with a suspension of polytetrafluoroethylene, the surface was dried at 120° C. for one hour.

The contact angles of pure water and oil (Nisshin salad oil) on the substrates of Examples 1–12 and References 1–3 were measured. The measurement of the angles was carried out right after the chemically adsorbed films or coating films were formed, and then after rubbing the surfaces of the films 10,000 times with cloth wetted with water. The results are shown in Table 1.

TABLE 1

|  | Contact Angle of Water (°) | | Contact Angle of Oil (°) | |
| --- | --- | --- | --- | --- |
|  | Initial Number | After Rubbing Test | Initial Number | After Rubbing Test |
| Example 1 | 151 | 139 | 126 | 115 |
| Example 2 | 144 | 143 | 122 | 111 |
| Example 3 | 141 | 140 | 124 | 113 |
| Example 4 | 142 | 142 | 113 | 111 |
| Example 5 | 142 | 140 | 123 | 112 |
| Example 6 | 141 | 140 | 122 | 110 |
| Example 7 | 141 | 137 | 120 | 118 |
| Example 8 | 140 | 140 | 124 | 111 |
| Example 9 | 142 | 141 | 122 | 110 |
| Example 10 | 142 | 139 | 120 | 119 |
| Example 11 | 137 | 136 | 121 | 113 |
| Example 12 | 142 | 139 | 122 | 119 |
| Reference 1 | 92 | 44 | 63 | 31 |
| Reference 2 | 143 | 135 | 121 | 110 |
| Reference 3 | 134 | 63 | 114 | 40 |

As clearly seen from Table 1, the chemically adsorbed films having water- and oil-repelling properties of the invention maintained their water- and oil-repelling properties even after being rubbed with a wet cloth. In Reference 1, however, water- and oil-repelling properties were lost after the rubbing test. In case of Reference 2 where the substrate surface was not treated with oxygen plasma or corona discharge, a chemically adsorbed film was formed only on the surfaces of the fillers, thus providing endurance and some water- and oil-repelling properties to the surfaces. In Reference 3, while water- and oil-repelling properties were retained to some extent, endurance was almost lost after the tests.

As explained above, the water- and oil-repelling properties of plastics and metals can be increased by means of this invention by treating FRP or FRM surfaces to partially expose the fillers and forming chemically adsorbed monomolecular or polymer films on the surfaces.

In addition, the chemically adsorbed monomolecular or polymer films of the invention are formed on substrates via siloxane-based monomolecular films or polysiloxane films, which are formed at least on the exposed surfaces of filler partially protruding from the substrate surfaces. Therefore, the chemically adsorbed monomolecular or polymer films can be built up efficiently and adherently even if metals or plastics, which have only a few active hydrogen groups such as hydroxyl groups, amino groups, imino groups or the like on their surfaces, are used as substrates.

By using a chemical adsorbent comprising fluorocarbon groups and chlorosilyl groups, a fluorocarbon-based chemically adsorbed monomolecular film with water- and oil-repelling and anti-contaminating properties can be formed directly on FRM substrates such as Al, Cu, stainless steel or the like via chemical bonds. The film is also extremely thin at a uniform thickness, highly dense, pinhole free, and durable. Therefore, this invention can provide a fluorocarbon-based chemically adsorbed ultra-thin film, which has significant endurance, water- and oil-repelling and anti frosting properties.

Chemically adsorbed monomolecular or polymer films of the invention are applicable to substrates requiring ultrathin coating films with heat-, weather- and abrasion-resisting, water- and oil-repelling, and anti-frosting properties—including electric goods such as hot plates, rice steamers and electronics, automobiles, industrial equipment, etc.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the forego:tag description, and all changes which come within the meaning and range of equivalency of the claims are intended to be embraced therein.

We claim:

1. Water- and oil-repelling members, wherein at least one filler protruding from the surface of a reinforced material comprising fillers is covered with a chemically adsorbed film having water- and oil-repelling properties, and wherein said chemically adsorbed film is covalently bonded to said filler.

2. Water- and oil-repelling members according to claim 1, wherein said filler is at least one material selected from the group consisting of ceramics, glass, metals and synthetic fibers.

3. Water- and oil-repelling members according claims 1 or 2, wherein a siloxane-based chemically adsorbed monomolecular or polymer film is formed on said filler via covalent bonds, and wherein said chemically adsorbed film having water- and oil-repelling properties is formed on said siloxane-based chemically adsorbed monomolecular or polymer film via covalent bonds.

4. A method of manufacturing water- and oil-repelling members comprising:
exposing at least one filler so that it protrudes from a surface of a reinforced material containing the filler;
contacting the surface of said reinforced material with a solution containing chlorosilane-based chemical adsorbent, thus directly or indirectly chemically adsorbing said chlorosilane-based chemical adsorbent to at least a surface of said filler;
washing and removing unreacted chemical adsorbent with a nonaqueous organic solvent; and
reacting the chlorosilyl groups of said chemical adsorbent remaining on the surface of said reinforced material with water, thereby forming a chemically adsorbed monomolecular film.

5. A method of manufacturing water- and oil-repelling members according to claim 4, wherein said chlorosilane-based chemical adsorbent is $CF_3(CF_2)_n(R)_mSiX_pCl_{3-p}$ (wherein n represents 0 or an integer; R represents an alkyl group, a vinyl group, an ethynyl group, or a substituent comprising a silicon or oxygen atom; m represents 0 or 1; X represents H, an alkyl group, an alkoxyl group, or a substituent comprising a fluoroalkyl group or a fluoroalkoxy group; and p represents 0, 1 or 2).

6. A method of manufacturing water- and oil-repelling members according to claim 4, wherein said filler is caused to protrude from the surface of said reinforced material by sandblasting, etching, polishing, or plasma treatment.

7. A method of manufacturing water- and oil-repelling members comprising:
exposing at least one filler so that it protrudes from a surface of a reinforced material containing the filler;
contacting the surface of said reinforced material with a solution containing a chlorosilane-based chemical adsorbent, thus directly or indirectly chemically adsorbing said chlorosilane-based chemical adsorbent to at least the surface of said filler;
evaporating the solution containing unreacted chemical adsorbent; and
reacting said chlorosilyl groups on the surface of said reinforced material with water, thereby forming a chemically adsorbed polymer film.

8. A method of manufacturing water- and oil-repelling members according to claim 7, wherein said chlorosilane-based chemical adsorbent is $CF_3(CF_2)_n(R)_mSiX_pCl_{3-p}$ (wherein n represents 0 or an integer: R represents an alkyl group, a vinyl group, an ethynyl group, or a substituent comprising a silicon or oxygen atom; m represents 0 or 1; X represents H, an alkyl group, an alkoxyl group, or a substituent comprising a fluoroalkyl group or a fluoroalkoxy group; and p represents 0, 1 or 2).

9. A method of manufacturing water- and oil-repelling members according to claim 7, wherein said filler is caused to protrude from the surface of said reinforced material by sandblasting, etching, polishing, or plasma treatment.

* * * * *